Patented Sept. 17, 1929

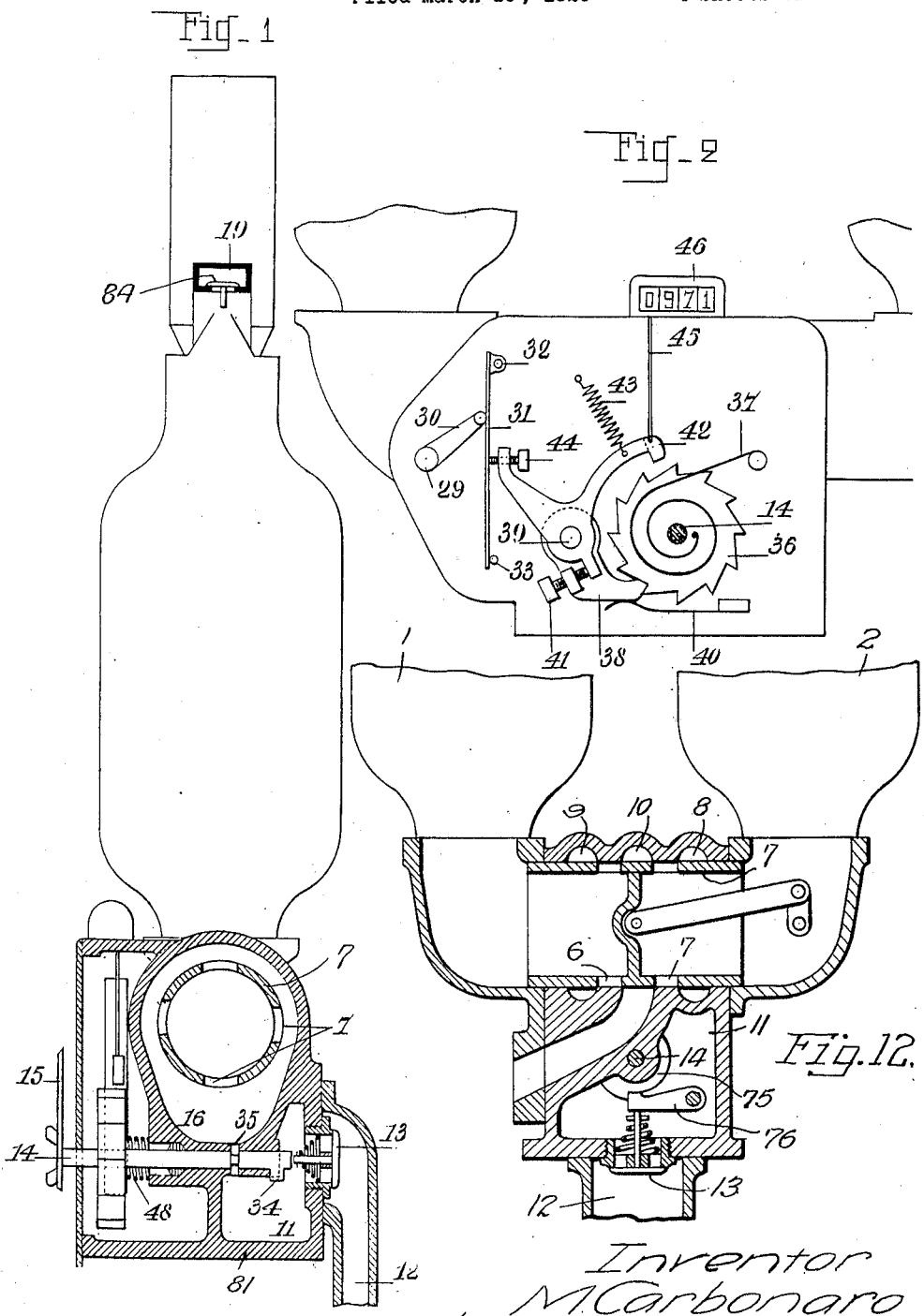

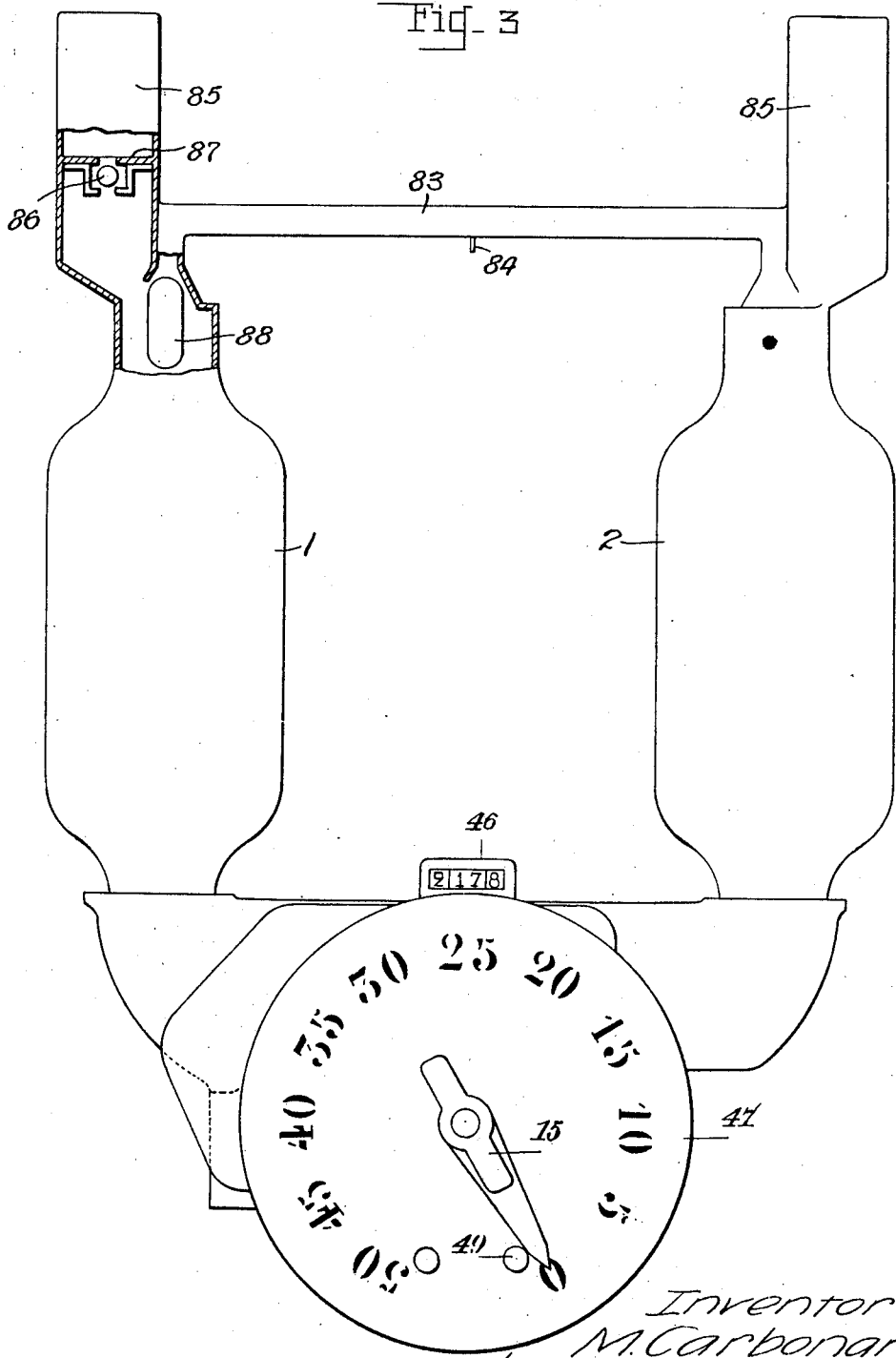

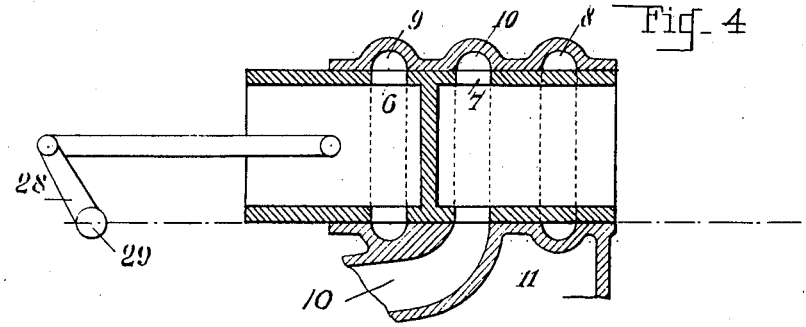
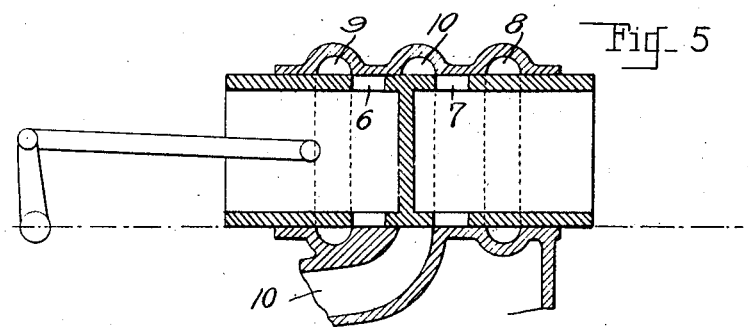
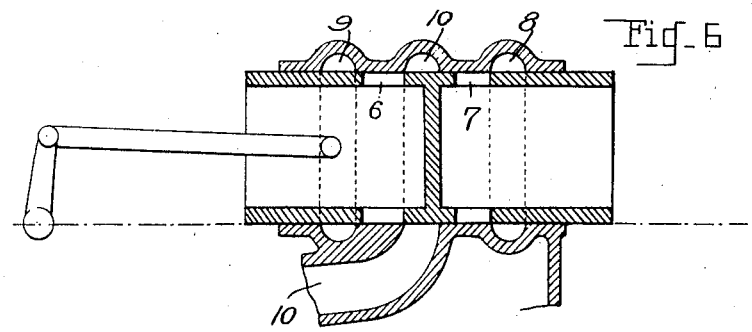
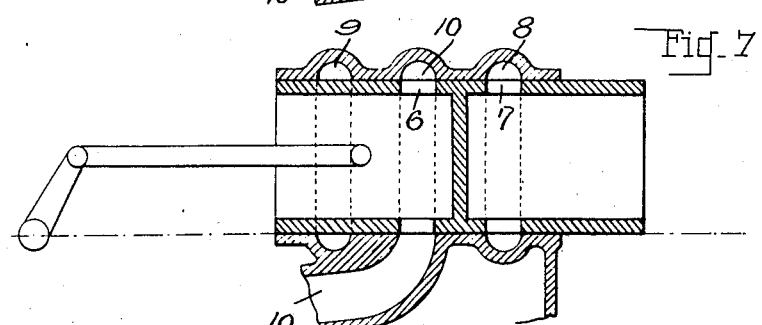

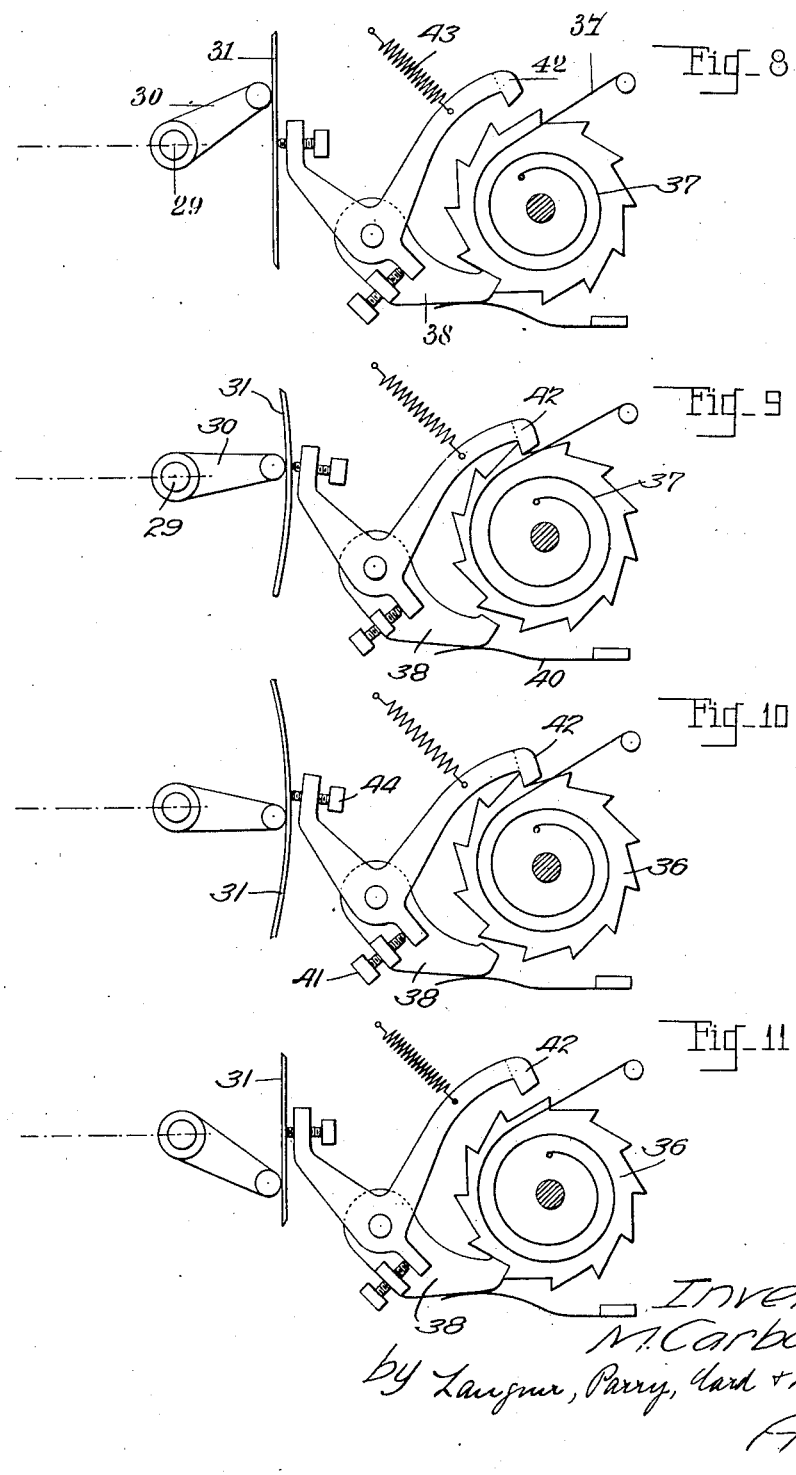

1,728,821

UNITED STATES PATENT OFFICE

MARIO CARBONARO, OF PARIS, FRANCE

SERVO METER FOR LIQUID DISTRIBUTORS

Application filed March 15, 1926, Serial No. 94,936, and in France April 10, 1925.

This invention relates to liquid vending apparatus, and in particular to a servo-meter adapted for use with apparatus of that type in which there are two alternately filling and discharging measuring vessels the alternate functions of which are controlled by a distributing valve intercalated in a supply conduit for liquid under pressure communicating with said vessels, and also interposed in the discharge conduit leading from said vessels, which valve normally remains stationary in either of its two controlling positions while one or the other of the vessels is being filled, but being responsive to the pressure value of the liquid under pressure, transmitted to said valve through the body of liquid in either of the vessels at the moment when said vessel becomes completely filled, said valve moving under the impact of said pressure to the other of its controlling positions, so as to reverse the functioning of said measuring vessels.

The general object of the present invention is to provide a servo-meter which upon being set to cause the delivery from said vessels of the desired number of units of liquid, measured in terms of the capacity of the measuring vessels, will automatically first preliminarily open the means of communication between the supply of liquid and one of said vessels through said distributing valve, and then return, step-by-step as the units of liquid are delivered, to its zero position, and finally upon reaching said zero position, cutting off communication between the source of supply and the distributing valve.

Another object of the invention is to provide a servo-meter as above described that shall operate registering means for recording the number of units of the measuring liquid delivered.

An illustrative embodiment of the invention is disclosed in the accompanying drawings in which:—

Fig. 1 is a side elevation showing one of the measuring vessels, and showing also the servo-meter and distributing valve in vertical section.

Fig. 2 is a front elevation showing the mechanism of the servo-meter, the dial being removed.

Fig. 3 is a front elevation of the measuring vessels and servo-meter, the wall of one of the measuring vessels being broken away over a small area in order to show certain check valves.

Figs. 4, 5, 6, and 7 show consecutively longitudinal sectional views through the distributing valve in positions corresponding to the positions shown in consecutive Figs. 8, 9, 10 and 11 which in turn illustrate in elevation the compound pawl and pawl actuating means of the servo-meter.

Fig. 12 is a vertical section through the servo-meter and distributing valve showing an alternative arrangement for cutting off the supply of liquid under pressure from the distributing valve.

Referring now in detail to the several figures and first adverting particularly to Figs. 1, 3 and 12, an outlined description will be given of the vending apparatus which in itself does not form a part of the present invention being described in applicant's pending application #94,935, an understanding of which will clarify the description of the servo-meter.

In Figs. 3 is noted a pair of measuring vessels 1 and 2 each in permanent communication with the opposite sides of a distributing valve 70 as is clearly shown in Fig. 12.

A supply pipe 12 is also shown in Fig. 12 leading from a source of liquid under pressure. The supply pipe 12 communicates, when the valve 13 is open with a chamber 11 in permanent communication with annular ports 9 and 8 surrounding the distributing valve 7. Said valve has an intermediate imperforate wall 80 segregating the measuring vessels which communicate with opposite sides of the valve and on each side of said wall the valve is provided with ports 6 and 7 which upon shifting of said valve to one or the other of its extreme positions places one or the other of the measuring vessels into communication with the chamber 11. The apparatus is provided with a discharge passage 10 adapted to be connected with a delivery hose or other ultimate discharge device and it is obvious that when one of the ports, 6 or 7 has placed one of the measuring vessels into communication with the liquid under pressure, the other said port has placed the other measuring vessels into communication with the discharge passage 10.

It is to be noted from Fig. 3 that the vessels 1 and 2 are connected by a conduit 83 having an atmospheric inlet check valve 84 best shown in Fig. 1. The purpose of this connecting conduit 83 is to prevent the vapor laden atmosphere in either of the chambers from getting out into the open air when it is displaced by the incoming liquid during the filling operation. In the case of gasoline, such an escape of the vapors into the open air would create a fire hazard. By means of the conduit 83, the vapor laden atmosphere is transferred from the vessel being filled to the one being emptied. The object of the atmospheric check valve is to prevent a vacuum ever forming in either of the vesesls due to contraction of the atmosphere therein in cold weather or in the cooler parts of the day, which vacuum might interfere with the reliability in the operation of the apparatus.

The connecting or by-pass conduit 83 is provided with a float valve 88 which closes when the liquid in the vessel being filled has reached a certain height in this vessel. This is to prevent the liquid from one vessel from flowing into the other and also has for its purpose, as will now appear, to permit the trapping of some of the atmosphere in the vessel being filled.

It will be noted from Fig. 3 that each of the measuring vessels 1 and 2 includes an air chamber 85 and that between the air chamber and that part of the measuring vessel designed to be filled with liquid a check valve 86 is placed which, as shown, has the form of a float. This float closes as soon as the level of liquid in the measuring vessel reaches the top of the vessel which in Fig. 3 is indicated by the numeral 87. In operation, considering the distributing valve to be in the position shown in Fig. 4, the supply chamber 11 is in communication by means of the valve port 6 with the measuring vessel 1, while at the same time the measuring vessel 2 is by means of the valve port 7 in communication with the discharge passage 10. Liquid under pressure of the source passes through the distributing valve into the chamber 1 filling the latter and of course, causing a rise in the head of liquid in the vessel 1 the pressure of which head is not sufficient to move the distributing valve 70. When the level of liquid approaches the top of the measuring vessel it raises the float 88 which closes the by-pass conduit 83. Thereafter, the trapped atmosphere in the measuring vessel 1 passes into the air chamber 85 through the check valve 86 until finally when the liquid level has caused said check valve to float the vessel 1 is completely filled up to its top 87, all the atmosphere being driven past the check valve into said air chamber. At the moment when the check valve 86 closes the liquid in the measuring vessel is no longer under the pressure of gravity but under the pressure of the source, which pressure is instantly transmitted as an impact blow upon the distributing valve 70 driving it over to the position shown in Fig. 5. It does not stop in this position, however, for it would be a neutral position in which neither of the measuring vessels could function, but it is kept moving by the release of pressure from the air chamber 85 due to the expansion of said atmosphere as soon as the level of liquid in the measuring vessel 1 declines from the top 87 and permits the opening of the check valve. Thus, the valve is automatically moved over to its opposite extreme position in which the measuring vessel 2 is placed in communication with the source of supply while the measuring vessel 1 is placed in communication with the discharge passage 10.

The servo-meter comprises a shaft 14 shown in Fig. 1 on the outside of which is an indicator 15 provided with an operating key or handle 15'. The indicator 15 cooperates with a dial 47 on which multiples of the units which the vending apparatus is adapted to deliver are indicated. The shaft 14 moves with the indicator. Said shaft operates in bearings in a housing 81 being reciprocable as well as rotatable. The valve 13 which controls the placing of the supply conduit 12 into communication with the chamber 11 is in that form of the invention shown in Fig. 1 in alinement with the shaft 14. When the servo-meter is operated, the shaft 14 is moved endwise by pressing inwardly upon the key 15' against the tension of the spring 48. When the shaft 14 is thus moved it engages the stem of the valve 13 opening the latter so that the liquid from the conduit 12 immediately enters the chamber 11. When the operator has pushed the key 15' inwardly he then rotates the indicator 15 and with it the shaft 14 through such an angle as will bring the indicator opposite the movement of units marked on the dial which he desires the vending apparatus to deliver. It will be noted that the shaft 14 has a lug 34 normally fitting into a slot formed in a housing 81 and that when the shaft is first depressed and then moved angularly the lug 34 engages the housing outside of said slot so that the shaft cannot return to its normal position under the urge of the spring 48 until it has automatically rotated to such a position that the lug 34 again falls into its slot.

The shaft 14 is biased by a spring 37 shown in Fig. 2 to return to a normal position in which the indicator 15 rests on zero. When the operator turns the indicator to indicate the number of units which the apparatus is to deliver he winds the shaft 14 against the tension of the spring 37.

The filling of one of the measuring vessels starts immediately the shaft 14 has been pushed in and the valve 13 opened. Upon the indicator 15 having been turned to the desired number of units as indicated on the dial this indicator begins automatically to return to its zero position by step-by-step movements as each of the filling vessels discharges. To control this step-by-step movement, the shaft 14 is provided with a ratchet wheel 36 controlled by an escapement in the form of a compound pawl having the arms 38 and 42 oscillatable about a common pivot 39 and embracing the teeth of the ratchet wheel on opposite sides in such a manner as to permit a half-tooth rotation of said ratchet wheel and shaft upon the release movement of each pawl. The compound pawl is actuated through a leaf-spring 31 engaged by an adjustable thumb screw 44 upon the compound pawl, said spring being pivoted at one end as shown at 32 in Fig. 2 and engageable with a stop 33 at its other end, said spring being deflected in the middle toward said compound pawl by the action of an arm 30 on a shaft 29, which shaft also carries an arm 28 connected to the distributing valve. Thus, the movements of the distributing valve which are controlled automatically by the filling of the measuring vessels, in turn actuates the spring 31 by means of which the compound pawl is actuated. Referring now to Figs. 4 and 8 it will be noted that when the distributing valve is in one end position, the arm 30 rests with relatively great angularity against spring 31 producing no deflection in said spring. This permits the pawl 42 to stand away from the ratchet wheel while the pawl 38 abuts against the shoulder of one of the teeth of the ratchet wheel. It is noted from Figs. 5 and 9 that when the distributing valve is approaching its middle or neutral position as regards the measuring vessels, the arm 30 has pressed the spring 31 into a convex contour against the compound pawl so that the pawl 42 has been pushed into contact with the ratchet wheel while the pawl 38 has been released from said ratchet wheel. Comparing Figs. 8 and 9 it will be observed that whereas the pawl 42 in Fig. 8 was opposite the middle of one of the teeth, immediately upon the release of the pawl 38 the ratchet wheel slipped around through an angular distance equal to one half the length of a tooth so that now the pawl 42 rests against a shoulder of the tooth while the pawl 38 is adjacent the middle of a tooth.

Comparing Figs. 6 and 10 it is noted that when the distributing valve is approaching its opposite extreme position the arm 30 has passed the dead center with respect to the spring 31 but the spring is still bowed sufficiently to hold the compound pawl in the same position as that shown in Fig. 9, while in Fig. 7, the distributing valve has reached its said opposite extreme position and the arm 30 now lies at such an angle to the spring 31 that the latter has straightened out permitting the release of the pawl 42 and the corresponding engagement of the pawl 38 with the ratchet teeth, the ratchet wheel having at this time slipped an angular distance equal to a half length of the tooth. Thus, while the distributing valve has moved from one extreme position to another, in other words, during the time it has taken for one measuring vessel to become completely discharged, the ratchet wheel 36 has returned towards its original or zero position an angular distance corresponding to the length of one tooth. It is obvious that when the designated number of units have been delivered the ratchet wheel and with it the shaft 14 and indicator 15, will have moved back to zero, at which point the lug 34 will have slipped into its notch releasing the shaft 14 and closing the valve 13.

With reference to the compound pawl, the two pawl elements thereof may be regulated by means of adjusting screw 41. Normally, the pawl 42 is kept away from the ratchet wheel by means of a spring 43, while the pawl 38 is kept in contact with ratchet wheel by means of spring 40. The pawl 42 may be connected by any suitable means such as rod 45 with recording means 46 by means of which the total number of oscillations of said pawl, which corresponds to the number of units of liquid delivered, may be recorded.

Fig. 12 presents a slight modification of the invention in which the valve 13 is not in alinement with shaft 14 but to one side thereof. In this form of the invention the shaft 14 is provided with a cam 75 which actuates a pawl 76 acting on the steam of valve 13. In this instance it is not necessary to push the shaft 14 inwardly for the initial opening of this valve but merely to turn the shaft to the position in which the number of units of liquid to be delivered is indicated during which turning movement the valve is opened by said cam. The cam is, of course, so fixed that upon return of shaft 14 to zero position the elevation of the cam has receded to such an extent that the valve 13 is no longer open.

While I have in the above endeavored to describe a practical embodiment of my invention, it is to be understood that the details of construction are merely illustrated and not to be construed as limitative in their bearing upon the invention.

Having now particularly described and ascertained the nature of my said invention and in what manner the same is to be performed, I declare that what I claim is:

1. A servo meter for a liquid distributing device including a shaft, a spring normally biasing said shaft for rotation in one direction, a dial, and a supply valve controlling a function of the distributing device, an indicating handle on said shaft for turning it against the tension of said spring through an angle, referred to said dial having a value representing the number of units of the liquid to be distributed, a ratchet wheel on said shaft, and an escapement device including correlated pivoted pawls cooperable with the ratchet wheel, the teeth of said ratchet wheel being disposed in such a way as to permit free uni-directional movement of said shaft with respect to said pawl in the direction opposed to the spring tension, said escapement device being oscillatable to permit the tooth by tooth rotation of said ratchet wheel in the opposite direction, said shaft being provided with means for actuating said supply valve.

2. A servo meter according to claim 1 in which the means for opening the supply valve comprises a cam unitary with the shaft, said cam having a notch, a lever oscillatably mounted and having a tooth normally seated in said notch, said lever cooperating with the stem of said supply valve.

3. A servo meter according to claim 1 in which the double pawl device comprises two separate pawls independently coaxially mounted cooperating with the ratchet wheel, a spring normally biasing said pawl in a direction to hold said pawl normally withdrawn from the teeth of the ratchet wheel, said pawl being provided with an adjustable lever actuated by the distributing member of the apparatus and a rod arranged to control a totalizer, a spring normally biasing said second pawl in a direction tending to apply it to the teeth of the ratchet wheel, and having an adjustable stop engageable with the first pawl whereby the second pawl is released from the teeth of the ratchet wheel by the first pawl when the latter is moved to a position of engagement with the ratchet wheel.

4. A servo-meter for a liquid distributing device including a shaft mounted for both longitudinal and rotary motion, a spring normally biasing said shaft for rotation in one direction, a dial, a supply valve controlling a function of the distributing device, an indicating handle on said shaft by which it may be turned against the tension of said biasing spring through an angle referred to said dial, having a value corresponding to the number of units of the liquid being distributed, said shaft being provided with means for actuating said supply valve to open the same, a spring in abutment between said shaft and a fixed part, said shaft having a lug normally retained into a notch in a fixed part of said apparatus under pressure of said abutment spring, normally to inhibit rotation of said shaft, the latter being rotatable upon the withdrawal of said lug from said notch by endwise movement of said shaft in a direction opposed to the direction of pressure of said abutment spring, a ratchet wheel on said shaft, and an escapement device cooperable with the ratchet wheel, the teeth of said ratchet wheel being disposed in such a way as to permit free uni-directional movement of said shaft with respect to said pawl in the direction opposed to the tension of said biasing spring, said escapement device being oscillatable to permit the tooth by tooth rotation of said ratchet wheel.

In testimony whereof I have signed my name to this specification.

MARIO CARBONARO.